Sept. 8, 1931.  W. A. BLUME  1,822,430
FRICTION CLUTCH BLOCK
Filed April 3, 1929
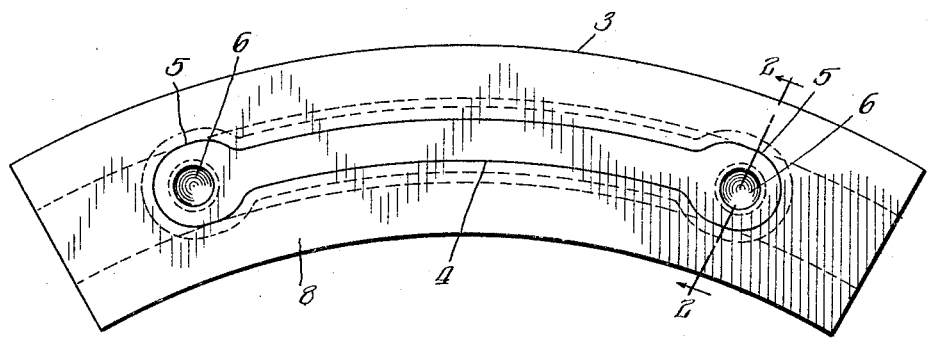
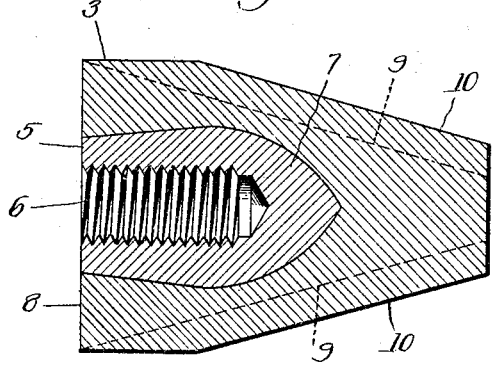
Inventor:-
William A. Blume
By M. O. Bell atty.

Patented Sept. 8, 1931

1,822,430

UNITED STATES PATENT OFFICE

WILLIAM A. BLUME, OF DETROIT, MICHIGAN, ASSIGNOR TO AMERICAN BRAKE MATERIALS CORPORATION, OF NEW YORK, N. Y., A CORPORATION OF NEW YORK

FRICTION CLUTCH BLOCK

Application filed April 3, 1929. Serial No. 352,246.

This invention relates to friction blocks for clutches and its object is to maintain the block in predetermined shape so that the attaching openings therein will constantly be maintained in position for registration with and to receive the attaching devices.

A further object of the invention is to prevent the friction block from warping or otherwise becoming distorted so that the attaching openings therein will always be in position to receive the attaching devices.

In the accompanying drawings I have illustrated a selected embodiment of the invention and referring thereto, Fig. 1 is a plan view of the friction clutch block.

Fig. 2 is a transverse sectional view on the line 2—2 of Fig. 1.

The block comprises a body 3 made of suitable composition or other material and it is provided with a longitudinal rigid insert 4 made of metal or other suitable material having enlarged ends 5 with attaching openings 6 therein, said openings being threaded in the present instance. The block is arcuately curved longitudinally and is tapered transversely, and the insert is correspondingly curved and preferably tapers at 7 in the tapered part of the body.

It is desirable that the openings should be constantly centered in predetermined position with relation to each other to receive threaded attaching devices and the provision of the longitudinal insert seated in the body and with the attaching openings formed in the ends thereof serves to prevent the block from warping or otherwise becoming distorted and maintains the attaching openings always in proper centered relation and adapted to receive the attaching devices. The insert may be exposed at the back 8 of the block throughout its length and it is sufficiently spaced from the limit of wear indicated by the dotted lines 9—9 of the friction surfaces 10 to avoid engagement with the opposing friction surfaces.

The device may be used in connection with a flywheel provided with an annular groove in one face thereof, the groove being tapered complementarily to the friction surfaces 10 whereby when said surfaces are engaged in said groove the flywheel will be connected to the driven member carrying the blocks having the friction surfaces thereon, it being understood that the blocks are arcuate in form to permit installation in ring-like position for cooperation with the annular groove.

I have shown the invention in one embodiment but I reserve the right to change the form, construction and arrangement of parts to adapt the invention for blocks of other sizes and shapes, and for other purposes, within the scope of the following claims.

I claim:

1. A friction clutch block comprising a body transversely tapered on one face thereof and having an elongated rigid insert seated in the opposite face of the body and provided with openings to receive the attaching devices.

2. A friction clutch block arcuately curved longitudinally and tapered transversely, said block comprising a body and a rigid insert extending longitudinally of the body and curved to correspond therewith, said insert having openings at its ends extending through one face of the block to receive attaching devices.

3. A friction clutch block comprising a composition body arcuately curved longitudinally and tapered transversely, and an elongated rigid insert seated in the body longitudinally thereof and curved to correspond with the curvature of the body, said insert having enlarged ends and openings in said ends to receive attaching devices.

4. A friction clutch block comprising a composition body arcuately curved longitudinally and tapered transversely, and an elongated rigid insert seated in the body longitudinally thereof and curved to correspond with the curvature of the body, said insert having enlarged ends and openings in said ends to receive attaching devices, said enlarged ends being tapered whereby the surfaces thereof will be equidistantly spaced from adjacent surfaces of the body.

WILLIAM A. BLUME.